United States Patent [19]

Rampel et al.

[11] Patent Number: 4,487,391

[45] Date of Patent: Dec. 11, 1984

[54] SEAT ADJUSTMENT MECHANISM PARTICULARLY FOR A MOTOR VEHICLE SEAT

[75] Inventors: Hans Rampel, Ahorn; Emil Dinkel; Volkmar Schulz, both of Coburg, all of Fed. Rep. of Germany

[73] Assignee: Metallwerk Max Brose GmbH & Co., Coburg, Fed. Rep. of Germany

[21] Appl. No.: 338,102

[22] Filed: Jan. 8, 1982

[30] Foreign Application Priority Data

Jan. 26, 1981 [DE] Fed. Rep. of Germany ....... 3102402

[51] Int. Cl.³ .......................................... F16M 13/00
[52] U.S. Cl. ..................................... 248/429; 188/83; 248/420; 403/149
[58] Field of Search ............... 248/429, 424, 419, 420, 248/430, 425; 403/149, 143; 74/409; 188/83

[56] References Cited

U.S. PATENT DOCUMENTS

| | | | |
|---|---|---|---|
| 1,378,783 | 5/1921 | Griffeth | 403/149 |
| 1,482,286 | 1/1924 | Colley | 403/149 |
| 2,554,346 | 5/1951 | Reid | 188/83 |
| 2,684,260 | 7/1954 | Hawley | 403/149 |
| 2,783,861 | 3/1957 | Jungles | 188/83 |
| 2,919,744 | 1/1960 | Tanaka | 248/429 |
| 3,155,363 | 11/1964 | Lohr | 248/419 |
| 3,430,519 | 3/1969 | Pickles | 248/420 |
| 3,957,144 | 5/1976 | Opyrchal | 188/83 |
| 4,005,612 | 2/1977 | Lippincott | 403/149 |
| 4,210,303 | 7/1980 | Torta | 248/429 |
| 4,272,048 | 6/1981 | Kluting et al. | 248/430 |
| 4,305,307 | 12/1981 | Kiunke | 74/409 |
| 4,364,536 | 12/1982 | Kluting | 248/429 |

Primary Examiner—William H. Schultz
Assistant Examiner—Ramon O. Ramirez
Attorney, Agent, or Firm—Toren, McGeady and Stanger

[57] ABSTRACT

A seat adjustment mechanism especially suited for motor vehicle seats is composed of at least one motor mechanism for adjustably moving a seat member through a drive connection having at least two mutually engaging force transmission parts. In order to avoid rattling of the adjustment mechanism when adjusting movement of the seat is to be effected in a direction where the adjusting movement is abetted by the weight of the seat member itself, a braking device is provided which counteracts the adjusting force of the motor mechanism applied in that direction.

19 Claims, 4 Drawing Figures

SEAT ADJUSTMENT MECHANISM PARTICULARLY FOR A MOTOR VEHICLE SEAT

The present invention relates generally to a seat adjustment mechanism which is especially suitable for enabling adjustment of the position of the seat of a motor vehicle. More particularly, the invention is related to a mechanism which includes a seat member supported on an adjustable seat underframe with at least one adjustment motor being provided which is connected with the seat member through at least one drive connection having two mutually engaging drive or transmission parts.

In a seat adjustment mechanism of the type to which the present invention relates, an audible, perceptible rattling will occasionally occur during operation of the adjustment mechanism. It has become apparent that the rattling phenomenon occurs when the weight of the seat, combined with the weight of a passenger occupying the seat, acts in a direction abetting the force through which the adjusting movement of the seat member is effected by the motor of the adjusting mechanism. In a situation where the force exerted by the motor during the adjustment operation is of the same order of magnitude as a seat force, which may be defined as a force deriving from the weight of the seat itself and the weight of a person occupying the seat, which seat force acts in a direction abetting the force applied for adjusting the seat by the motor, it is possible that one of the parts of the drive mechanism may act relative to a mating part with which it engages, to alternately operate as a driving member and as a driven member. Thus, an alternating change of load application may occur which can involve a rather high frequency of occurrence. This could lead to extremely disturbing vibrations and noises unless the entire drive connection mechanism, and in particular the two mutually engaging drive parts, are manufactured with close tolerances so as to be free from play.

However, such precision in manufacturing generally tends to increase the cost of the parts involved and moreover renders the mechanism unsuitable for conventional mass production techniques.

In view of the foregoing, the present invention is directed toward providing a seat adjustment mechanism of the type mentioned above which will operate more quietly than devices presently known.

SUMMARY OF THE INVENTION

Briefly, the present invention may be defined as a seat adjustment mechanism particularly adapted for use in motor vehicles comprising a seat member, motor means for adjustably moving the seat member, transmission means including at least two mutually engaging transmission parts operatively interposed between the seat member and the motor means, and braking means for applying a braking force against adjusting movement of the seat member by the motor means in one direction, the direction of adjusting movement of the seat during which the braking force is applied being a direction in which the movement of the seat member by the motor means is in a direction abetted by a seat force exerted by the seat member.

As previously indicated, this seat force generally may be defined as a force generated by the weight of the seat itself and the weight of a passenger occupying the seat.

Thus, the objectives of the invention are achieved by providing a braking device which counteracts the adjusting movement of the seat member, when the adjusting movement is made in a first direction with the force moving the seat being abetted by the seat force which the seat exerts upon the underframe. As a result of the braking action, an effect is achieved whereby the drive connection, and therefore also the two mutually engaging drive parts, are maintained constantly under a defined tension which does not change. Hence, it will always be the same tooth surfaces which engage each other so that operation free from vibration may be ensured even when the drive parts which engage each other are formed so that there is play therebetween.

In a first embodiment of the braking device in accordance with the invention, when adjusting movement of the seat occurs in a first direction, a braking effect is created of such a type on the drive connection in the power path between the adjustment motor and the drive parts, that one of the drive parts which is nearer to the adjustment motor in the power path is acted upon by the adjustment motor with an adjusting force which is less than the seat force which is acting on the other of the drive parts. As a result of this, an effect is achieved whereby no load change of the drive connection occurs even at the beginning and at the end of the adjusting movement in the first direction because when the seat adjustment is stationary as well as while the adjusting movement is being effected, the other drive part under the effect of the dominant seat force will press against the one drive part always with the same tooth surfaces.

Another advantage involved is that the adjustment motor for the adjusting movement of the seat in the first direction may be dimensioned to be relatively smaller since the adjusting movement itself will be abetted by the force generated by the seat.

In another embodiment of the braking device in accordance with the present invention, when the adjusting movement of the seat is effected in the first direction, a braking effect is created on the drive connection in the power path between the drive parts and the seat member whereby one drive part which is nearer the adjustment motor in the power path is acted upon by the adjustment motor with an adjusting force greater than the seat force which is acting upon the other drive part and which is reduced by the braking action. This embodiment is especially advantageous under circumstances where it is simpler to brake the other of the two drive parts which are in engagement. A change of load occurs only at the beginning and at the end of the adjusting movement During the adjusting movement, the braking mechanism operates such that the adjusting power is dominant and such that the drive connection is therefore maintained constantly under a defined tension.

In accordance with the invention, the braking device is constructed as a frictional brake thereby permitting the braking mechanism to be formed of a simple construction which is economical to produce.

In accordance with one aspect of the invention, at least one plastic or rubber friction ring is provided between the outer circumference of a drive shaft and the inner circumference of a brake housing mounted on the seat underframe. Friction rings of this type are generally obtainable in many different dimensions.

In a further aspect of the invention, the drive shaft is embraced by a one-part or multi-part prestressed brake head of plastic or the like which is mounted on the seat underframe, rigidly connected for rotation. For setting a desired brake force, the brake head formed with a bifurcated construction may be provided with mutually engaging notched teeth on the ends of the bifurcated structure. It is, however, also possible to prestress the brake head by means of at least one screw connection.

When an adjusting movement is made in a second direction contrary to the first direction, the seat force will be applied in a direction opposing the motor drive force applied for adjustment of the seat. Under such circumstances, it is not necessary for a braking force to be applied and in order to eliminate the necessity for such a braking force to be overcome, the present invention is structured so that a freewheeling operation which renders the braking device inoperative may occur when the adjusting movement is made in a direction which must overcome the seat force, i.e., in a direction where the seat force does not abet the driving force for seat adjustment.

As a freewheeling system which is found more reliable in operation and yet economical to produce, a freewheeling system, and preferably a needle-bearing sleeve, is provided which in one rotational direction rotates with the drive shaft and which in the other rotational direction is freewheeling.

This freewheeling sleeve, in a suitable embodiment of the invention, can be mounted on the outer circumference of the drive shaft either inside a plastic or rubber friction ring or inside of a brake head.

When the seat is adjusted linearly in a forward or rearward direction, the seat having at least one upper rail furnished with a rack supported so as to be movable forwardly and rearwardly on a lower rail, the seat also having a drive pinion which meshes with the rack, a seat force occurs which on occasion will cause rattling in the adjusting movement as soon as the rail runs in a direction inclined to the horizontal. In this case, there is obtained a component of the seat force which corresponds to this inclination and which is directed in the longitudinal direction of the rails. If a low friction, ball track rail is used, there is no significant reduction in the power component by the force of any friction which develops between the rails. In order to avoid rattling during operation, the invention provides that the drive pinion be constructed as the one of the two drive parts and that the rack be constructed as the other of the two drive parts. As has been previously explained, the braking device may be formed to produce a braking effect either on the drive connection between the adjustment motor and the drive pinion or on the drive connection between the rack and the seat member.

At the same time, the braking device can also be constructed to work directly upon the drive pinion or upon the rack.

Preferably, the braking device is structured to engage a pinion shaft of a drive pinion of the driving mechanism since, in this case, the braking device may be built in an especially simple manner and may also be readily combined with the aforementioned freewheeling sleeve.

It is proposed that the drive pinion be connected with a worm gear arranged in a drive unit housing and be driven by a worm and that the brake housing be formed as part of the drive unit housing. A special brake housing for the purpose is consequently not necessary.

In an especially stable arrangement, there may be provided two upper rails running parallel with each other upon which the adjustable seat member is mounted. Each of these rails is provided with a rack and two lower rails are also provided with two drive pinions being connected with each other by means of a connector shaft, the drive pinions operating to engage the rack. In such a case, the braking device of the invention is provided in the area of one of the ends of the connector shaft or in the area of both ends of the connector shaft.

In the case where a seat adjustment mechanism is provided with at least one swivel lever constructed with a toothed sector and a drive pinion which operate for raising or inclining the seat member, with the drive pinion meshing with the toothed sector of the swivel lever, it is proposed in accordance with the invention that the drive pinion be constructed as one of the drive parts with the toothed sector being constructed as the other of the drive parts. By this approach, frequent change of load on lowering of the seat is prevented. If as proposed, the braking device engages a pinion shaft of the drive pinion, the effect will be achieved in that the adjusting power with which the drive pinion acts upon the toothed sector will always be less than the seat force conveyed from the toothed sector to the drive pinion so that no change of load will occur at any time.

In another embodiment of the invention, the braking device is structured to engage the swivel lever, an action which under certain circumstances is structurally easier to achieve, especially when two swivel levers rigidly connected for rotation with each other are provided and when at least one of the swivel levers is constructed with a toothed sector. In this case, the braking device may be made to engage the outer circumference of the connector shaft. Here, again, the braking device may be combined with a freewheeling sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
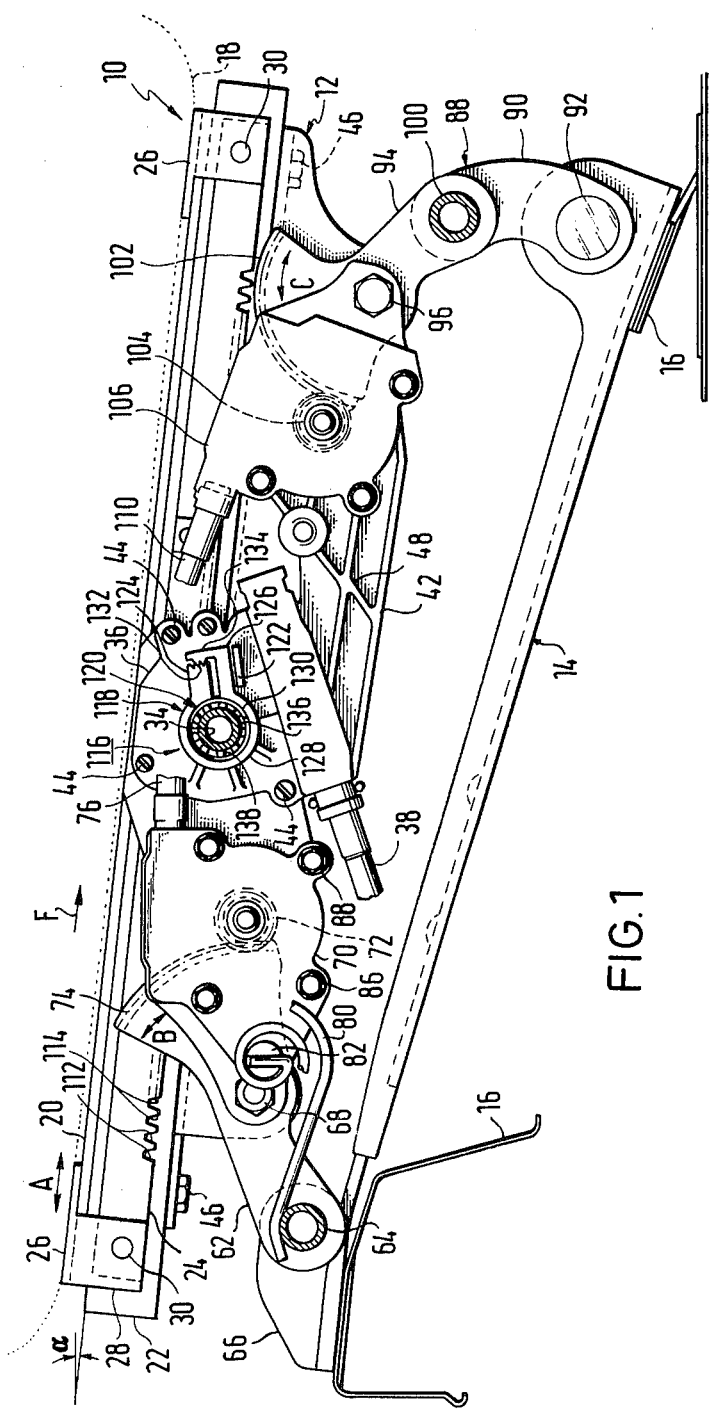
FIG. 1 is a side view partially in section of a first embodiment of a braking device in accordance with the invention taken along a line I—I of FIG. 2.
Figure 2:
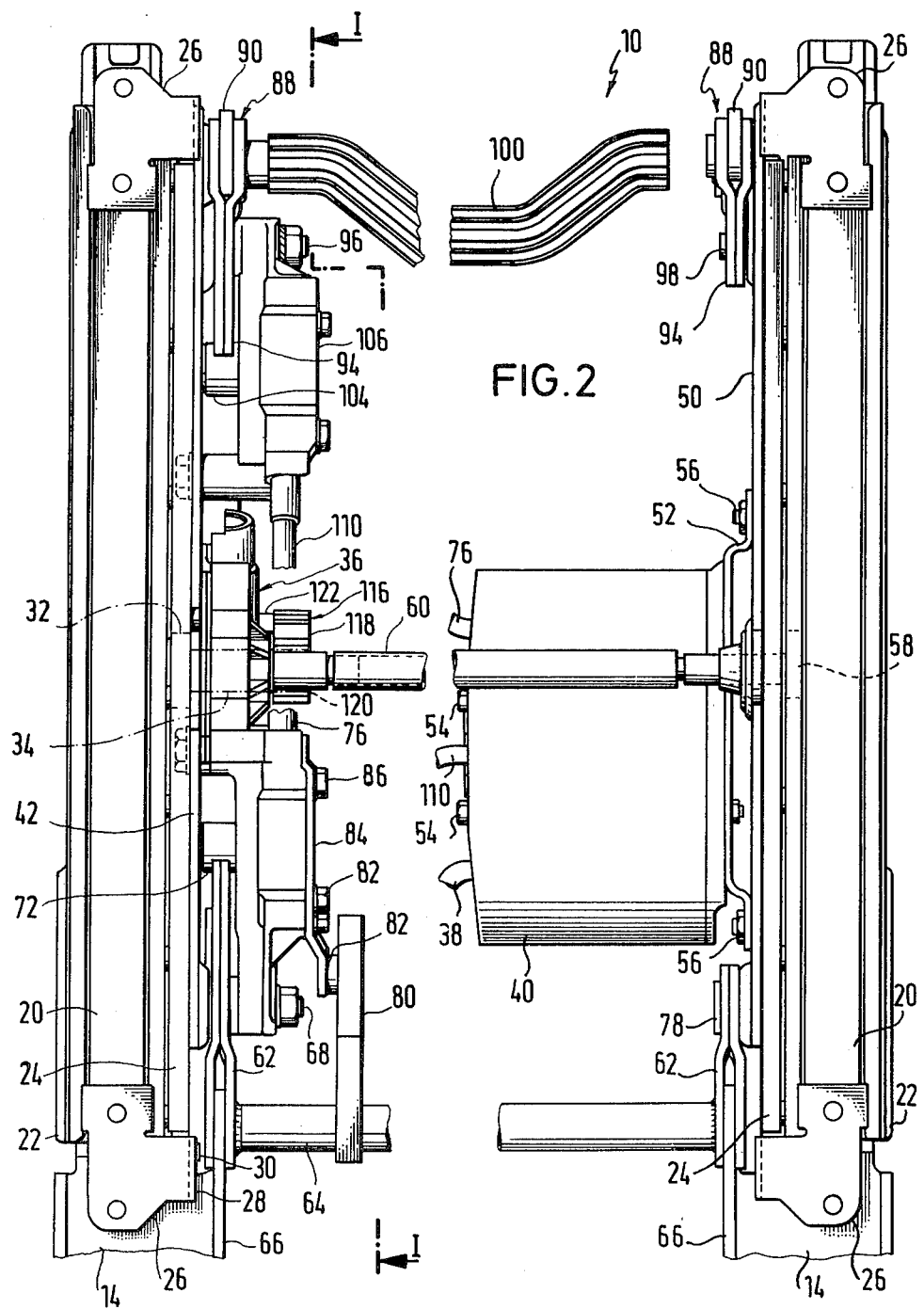
FIG. 2 is a top view of the arrangement shown in FIG. 1.

Referring now to FIGS. 1 and 2 wherein there is depicted a first preferred embodiment of the invention, a seat adjustment mechanism 10 is depicted which is basically composed of a seat underframe 12 adapted to be movably adjusted by operation of a motor. The assembly shown in FIG. 1 includes two bottom rails 14, one of which is visible in FIG. 1, by means of which the seat underframe 12 is fastened onto sheet metal holders 16 on the floor of the motor vehicle.

The motor vehicle seat member itself is designated by the reference numeral 18 and is shown in FIG. 1 in dotted line form. The seat member 18 is mounted upon two upper rails 20 which extend parallel with each other and which are, in turn, supported upon the two lower rails 22 so as to movable lengthwise relative thereto.

In order to accomplish motorized shifting of the two upper rails 20 which support the vehicle seat member 18 relative to the lower rails 22, a rack 24 is mounted on each of the upper rails 20. Additionally, an end piece 26 is fastened at both ends of each of the upper rails 20 with this end piece 26 including a lug 28 protruding downwardly and to the side which is bolted by a pin 30 to a corresponding end of the rack 24.

A drive pinion 32, which is shown in dotted line form in FIG. 2, is in meshing engagement with the rack 24. The drive pinion 32 is connected upon a drive shaft 34 indicated by dash-dot line, with the drive shaft 34 being driven by a worm gear drive 36 which is, in turn, connected with an electrical adjusting motor by means of a flexible connector shaft 38.

The adjusting motor is part of a motor unit 40 which includes besides the adjusting motor for driving the rack 24, thereby serving for lengthwise shifting of the seat member 18, two additional adjusting motors which operate to effect inclination and raising of the motor vehicle seat 18.

Figure 3:
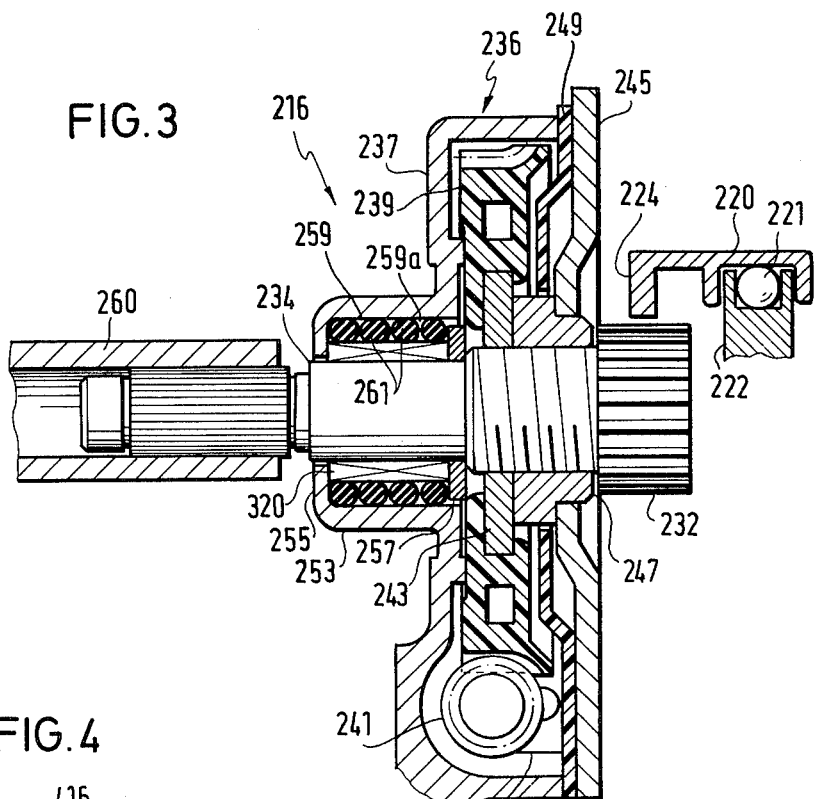
FIG. 3 is a sectional view showing a second embodiment of a braking device in accordance with the invention.

The basic construction of a worm gear drive of the type which may be used with the present invention and which represents a second embodiment of the invention is shown in FIG. 3. The embodiment of FIG. 3 is different from the embodiment shown in FIGS. 1 and 2 in that it, for example, involves a different construction of the upper rail, and the FIG. 3 embodiment will be described in greater detail hereinafter.

Referring now to the embodiment shown in FIGS. 1 and 2, the worm gear drive 36 is attached by means of screws 44 to a mounting plate 42. The mounting plate 42 is, in turn, attached by means of screws 46 to the lower rail 22. The mounting plate 42 is formed with reinforcing rings 48. A corresponding mounting plate 50 is also mounted on the lower rail 22 on the right side of the assembly, as seen in FIG. 2. The motor unit 40 is attached by screw and bolt connections 54 onto a fastening bracket 52 which is rigidly attached by screws 56 to the mounting plate 50.

In order to achieve an exactly simultaneous movement of the two upper rails 20, a drive pinion 58 corresponding to the drive pinion 32 is provided on the right side of the assembly as viewed in FIG. 2. The drive pinion 58 meshes with the rack 24 located on the right hand side, as seen in FIG. 2, of the assembly and it is connected for rotation by means of a tubular connecting shaft 60 with the drive pinion 32. The drive pinion 58 is indicated in FIG. 2 in dotted line form.

The two mounting plates 42 and 50 are connected at their left ends, as seen in FIG. 1, with a corresponding bottom rail 14, each by means of a swivel lever 62 which is pivotally supported on each of these parts.

Additionally, a connector shaft 64 welded with both swivel levers penetrates a corresponding bearing bore hole on a fastening lug 66 which extends upright on the respective ends of both of the bottom rails 14. The fastening lugs 66 are located within the swivel levers 62 which are formed with a bifurcated configuration best viewed in FIG. 2. The corresponding swivel lever 62 is pivotally supported on the mounting plate 42 by means of a pin 68 which additionally serves to fasten a worm gear drive 70. A drive pinion 72, indicated in dashed line in FIG. 1, of the worm gear drive 70 meshes with a toothed sector 74 of the swivel lever 62. A flexible drive shaft 76 connects the worm gear drive 70 with an adjustment motor part of the motor unit 40. This adjustment motor part is assigned to operate the worm gear drive 70. The swivel lever 62 shown on the right in FIG. 2 is articulated to the mounting plate 50 by means of a swivel pin 78. The connector shaft 64 ensures synchronous movement of both the swivel levers 62.

In order to facilitate raising of the left ends of the lower rails 22, as seen in FIG. 1, a spirally shaped prestressed leaf spring 80 is provided having one end resting against the connector shaft 64 with the other end extending into a transverse slit of a locking bolt or holding pin 82. The locking bolt 82 in turn protrudes from a holding plate 84 which is fixed on the worm gear drive 70 by means of screws 86. The right end of the mounting plates 42 and 50, as viewed in FIG. 1, are each connected by means of a dual lever joint 88 with the corresponding ends of the bottom rails 14. A first swivel lever 90 of each of the joints 88 is articulated at one end to the bottom rails 14 by means of bearing pins 92 and at its other end to an end of a second swivel lever 94. The second swivel lever 94 is in turn articulated to the mounting plate 42, 50 by means of bearing pins 96, 98. The two second swivel levers 94 are connected with each other for mutual rotation by means of a connector shaft 100 having several bends formed therein so that, just as in the case of the swivel levers 62, it is sufficient to drive one of the two second swivel levers 94 in order that both may be simultaneously driven. Additionally, the second swivel lever 94, like the swivel lever 62, is constructed with a toothed sector 102 which meshes with a drive pinion 104, indicated with a dashed line, of a worm gear drive 106. Fastening screws 108 hold the worm gear drive 106 on the mounting plate 42. The driving connection with a corresponding adjustment motor part of the motor unit 40 is established by means of a flexible drive shaft 110.

By suitable actuation of one or more of the adjusting motor parts of the motor unit 40, the motor vehicle seat member 18 can be optionally moved forwardly or rearwardly in a two-way direction indicated by the arrow A or it can be adjusted in its inclination or elevation by suitable pivoting of the swivel levers 62 and 94 in a two-way direction, as indicated by the double arrows B and C.

In the uppermost position of the seat member 18, the rails 20 and 22 will be inclined at an angle α relative to the horizontal. The total overall weight of the seat member 18 and of a person or passenger occupying the seat member 18 may be defined as a seat force F, which seat force is directed in the lengthwise direction of the seat assembly of the upper rail 20. Due to the low frictional mounting existing between the upper rail 20 and the lower rail 22, whereby ball bearings are utilized, friction between the upper and lower rails is relatively negligible. Accordingly, the rack 24 attached with the upper rail 20 engages with the drive pinion 32 under the influence of a force equivalent to the seat force F.

When the seat member 18 is adjusted toward the rear of the seat assembly—that is, when the upper rail 20 is moved from the left to the right as viewed in FIG. 1—an audible and perceptible rattling may occur if the power or motorized force which is applied for moving the seat member 18 is on the same order of magnitude as the seat force F. That is, the rattling will generally occur when the motorized drive force applied through the drive pinion 32 which is in engagement with the rack 24, is of about the same order of magnitude as the force F. Because play, caused by manufacturing and mounting tolerances, will occur between the rack 24 and the drive pinion 32, one or the other of the toothed surfaces 112, 114, shown to the left in FIG. 1, of the rack 24 will rest against corresponding toothed surfaces of the drive pinion 32 depending upon whether the seat force or the motorized adjusting force is greater. Depending upon the particular conditions, it may occur that rapid alternation between the two described types of engagement may occur and therefore very frequent changes of load can also occur. This rapid load change generates unpleasant vibrations and noises which will be quite noticeable as part of the rattling occurrences previously discussed.

In order to avoid this, the invention provides a braking device 116 which is shown in FIGS. 1 and 2 which operates a apply a force to prevent the occurrence of rattling or noise. The braking device 116 is composed of a brake head 118 which embraces a freewheeling sleeve 120 which, in turn, encompasses the drive shaft 34 (see also FIG. 2).

The brake head 118 shown in FIG. 1 is secured against clockwise rotation by a holding lug 122 which projects from the worm gear drive 36. In order to also exclude counterclockwise rotation, the brake head 118 is screw fastened to the holding lug 122. In this rotational direction, however, substantially less torque occurs than when rotation is in the counterclockwise direction due to the freewheeling sleeve 120, which will be discussed hereinafter.

The brake head 118 is constructed in the approximate shape of a fork with two thickened bifurcated ends 124 and 126 and with a middle section 128 which rests against an outer sleeve 130 of the freewheeling sleeve 120 with a frictional force engagement.

The middle section 128 is formed in an annular configuration and thus embraces the outer sleeve 130 along a circumferential line which is only slightly broken in the region of the fork ends 124, 126. Corresponding in size is the effective frictional surface between the outer sleeve 130 and the middle section 128.

The frictional force between the brake head 118 and the outer sleeve 130 of the freewheeling sleeve 120 may be varied in that the two fork ends 124, 126 which protrude generally radially from the outer sleeve 130 are spaced from each other in a circumferential direction. In the particularly simple embodiment shown in FIG. 1, the two fork ends 124, 126 are attached with each other by means of a counterhook tooth system 132 which permits one of the fork ends 124 to be engaged with the other fork end 126 at several locations. For this purpose, corresponding counterhooks are mounted at a frontal area of the fork end 124 which is distant from the freewheeling sleeve 120 as well as on a shoulder 134 which projects from the fork end 126 and which covers or overlaps this frontal area. As shown in FIG. 1, prestressing of the brake head 118 and therefore occurrence of a frictional force can be increased in a simple manner by moving the fork end 124 toward the fork end 126 until the counterhooks of the toothed system 132 engage each other. To loosen the prestressing frictional force, it is only necessary for the shoulder 134 to be bent radially outwardly until the teeth of the counterhook tooth system 132 no longer engage each other.

The construction of the freewheeling sleeve 120 is indicated schematically in FIG. 1. This freewheeling sleeve 120 is composed of a previously mentioned outer sleeve 130 and an inner sleeve 136 which is mounted on the drive shaft 34 rigidly connected for rotation therewith, with bearing needles 138 running between the inner sleeve 136 and the outer sleeve 130 at locations distributed over the circumference thereof. Because of the special curvature (not shown in FIG. 1) of one of the mutually facing circumferential surfaces of the outer sleeve 130 and the inner sleeve 136, the outer sleeve 130 can rotate freely in one rotational direction relative to the inner sleeve 136. In the case depicted herein, the outer sleeve 130 rotates freely relative to the inner sleeve 136 in the counterclockwise direction. When the outer sleeve 130 rotates in a direction opposite to said one rotational direction, however, a braking action of the outer sleeve 130 in relation to the inner sleeve 136 occurs.

In the case of a motor driven, rearward shifting of the seat member 18, i.e., when the seat member 18 and the upper rail 20 are to be moved in a direction indicated by the arrow F, the freewheeling sleeve 120 performs a blocking action so that the force exerted on the drive pinion 32 by the corresponding adjustment motor part through the drive shaft 38 and the worm gear drive 36 is diminished to a degree corresponding to the friction between the freewheeling sleeve 120 and the brake head 118. In this connection, the frictional force is set to a degree so that the resultant driving power with which the drive pinion 32 is driven by the adjusting motor part will always be perceptibly less than the seat force F which derives from the weight of the seat and the weight of the person sitting in the seat which operates to affect the rack 24. As a result, an effect is ensured such that when the adjusting motor is switched off as well as when it is running, the tooth surfaces 112 of the rack 24 always rest against the orresponding surfaces of the drive pinion 32. Change of load will not occur during operation.

An alternative embodiment of the braking device of the invention is shown in FIG. 3 wherein there is depicted a braking device 216. The braking device 216 is integrated into the worm gear drive 236 which corresponds to the worm gear drive 36 shown in the embodiment of FIGS. 1 and 2. In the embodiment of FIG. 3, a pinion 232 is provided supported upon a drive shaft 234. Here again, a connector shaft 260 is provided which corresponds with the connector shaft shown in FIG. 2 and which is engaged rigidly for rotation onto a correspondingly splined end of the drive shaft 234 in order to make a connection to the opposite drive pinion (not shown). The drive pinion 232 meshes with a rack 224 which is constructed in one piece with the upper rail 220. A ball 221 between the upper rail 220 and the corresponding lower rail 222 is provided in order to assure easy movement and proper ball track guidance.

The worm gear drive 236 is composed of a drive unit housing 237 in which a worm gear 239 and a drive worm 241 are arranged, the worm 241 meshing with the worm gear 239. The worm gear 239 is nonrotatably joined by casting with a flange 243 which is, in turn, rigidly connected for rotation on a drive shaft 234. In the axial direction (to the right in FIG. 3), the drive unit housing 237 is closed by a bearing cover 245 in which a bearing bushing 247 is pressed for the drive shaft 234. The bearing cover 245 is screwed or fastened in a manner not shown on the drive unit housing 237, with a plate 249 being interposed therebetween. The plate 249 which is composed of plastic supports two bearing shoulders 251 (only one being shown in FIG. 3) which project in the axial direction or to the left as seen in FIG. 3.

The drive worm 241 arranged between the bearing shoulders 251 with its two axial ends is rotatably supported at each end on one of the bearing shoulders 251.

In accordance with the device shown in FIG. 3, the braking device 216 is composed of a freewheeling sleeve 320 shown in simplified form upon which there is provided an inner sleeve (not shown) mounted rigidly for rotation on the outer circumference of the drive shaft 234. For receiving the freewheeling sleeve 320, the drive unit housing 237 is constructed with a cylindrical neck 253 projecting axially to the left as seen in FIG. 3. An edge 255 of the cylindrical neck 253 is bent over toward the drive shaft 234 and forms a stop for the left end of the freewheeling sleeve 320. At the right end of the freewheeling sleeve 320 there is provided a disc 257 having an enlarged diameter which braces itself to the right in FIG. 3 against an enlarged diameter section 259 of the drive shaft 234.

The inner diameter of the neck 253 is greater than the outer diameter of the freewheeling sleeve 320 so that a cylindrical annular space 259a is formed between the freewheeling sleeve 320 and the neck 253. The cylindrical annular space 259a is bounded in an axial direction on one side by the bent edge 255 and on the other side by the disc 257. Inserted in this annular space 259a are, for example, four rubber rings 261 being dimensioned to be somewhat larger than the dimensions of the annular space 259a so that the rings 261, when in a prestressed condition, will press against the outer circumferential surface of the freewheeling sleeve 320 as well as against the inner circumferential surface of the neck 253.

When the drive shaft rotates, if the freewheeling sleeve or its outer sleeve rotates therewith, the friction between the rubber rings 261 and the outer or inner circumferential surfaces of the freewheeling sleeve 320 or of the neck 253 will lead to a deceleration or braking of the turning movement and therefore to a lessening of the adjusting power with which the drive pinion 232 tends to adjust the rack 224. By suitable dimensioning of the rubber rings 261, the braking power of the brakng device 216, in a manner similar to that which may be accomplished with the embodiment according to FIGS. 1 and 2, is provided with a size such that the resultant adjusting force of the drive pinion 232 will always be less than the seat force with which the rack 224 is acted on by the weight of the seat and the driver. The pinion 232 thus is constantly pushed by the rack 224 whether the adjusting motor is in motion or deactivated. Hence, there will never arise a condition in which the drive pinion is rotated by the adjusting motor at a speed faster than it would be turned by the rack 224 alone.

Figure 4:
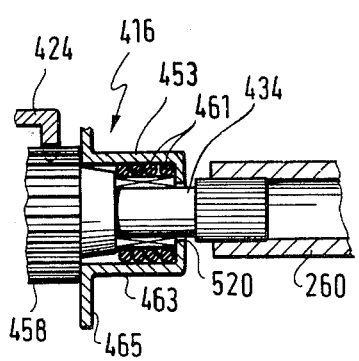
FIG. 4 is a sectional view a third embodiment of a braking device in accordance with the invention.

FIG. 4 shows another embodiment of a braking device in accordance with the invention. In FIG. 4, a braking device 416 is provided with rubber rings 461 between a freewheeling sleeve 520 mounted on a drive shaft 434 and a cylindrical section 453 of a housing. The functional mode of the embodiment of FIG. 4 is generally the same as in the case of the braking device 216 in accordance with FIG. 3, the basic difference being that the cylindrical section 453 in the FIG. 4 embodiment is part of its own brake housing 463 and is thus not integrated into the worm gear drive. Hence, the braking device 416 may, for example, be arranged on the end of the connector shaft 260 which is distant from the worm gear drive 236 shown in FIG. 3. A drive pinion 458 is rigidly connected for rotation on a drive shaft 434 which would then correspond to the drive pinion 58 shown in FIG. 2. A rack with which the drive pinion 458 engages or interacts is indicated at 424. The brake housing 463 is provided with a fastening flange 465 which extends radially outwardly, the flange operating to enable mounting of the brake housing 463 on the seat adjustment mechanism, for example on the mounting plate 50 such as is shown in FIG. 2.

The braking devices 116, 216, and 416 shown, respectively, in FIGS. 2, 3, and 4 may also be suitably altered or be integrated into or built into the worm gear drive 70 and/or 106 in order to exert a braking effect upon the drive pinion 72 or 104. The freewheeling sleeve is then so adjusted in each case that it has a braking effect on the corresponding drive pinion when the seat is lowered. Since here again a force corresponding to the seat force F is exerted on the swivel levers 62 or 94, a correspondingly effective braking force on the drive pinion 72 or 104 will prevent an undesired change of load which can very often occur between the toothed sector 74 or 102 and the corresponding pinion teeth.

The braking devices described above may, however, also be built into the seat adjustment mechanism 10 in such a manner that they have a direct effect upon the connector shaft 64 and/or upon the connector shaft 100 which would therefore enable provision of a relatively simple structure. In this case, the freewheeling sleeve is again connected in such a way that the braking device, by a corresponding rotation of the connector shaft, will counteract lowering of the seat. The braking force in this action can be high enough so that it will exclude automatic adjustment of the seat when the drive pinion is freewheeling. If now the seat is lowered by the corresponding adjustment motor being switched on, the drive pinion will drive the toothed sector of the corresponding swivel lever in a positive manner without the danger of shifting load effects.

While specific embodiments of the invention have been shown and described in detail to illustrate the application of the inventive principles, it will be understood that the invention may be embodied otherwise without departing from such principles.

What is claimed is:

1. A seat adjustment mechanism particularly for the seat of a motor vehicle comprising:
 a seat member;
 motor means for adjustably moving said seat member between a lower end position and a higher end position;
 transmission means including at least two mutually engaging transmission parts operatively interposed between said seat member and said motor means, said transmission parts being mounted on a base member; and
 braking means mounted on said base member for applying a braking force on one of said two mutually engaging parts only when said part is moving in a first direction relative to said base member, said first direction corresponding to a movement of said seat member toward said lower end position, said braking means including a freewheeling system, which renders said braking means inoperative only when said one part is moving into a second direction opposite to said first direction, said second direction corresponding to a movement of said seat member toward said higher end position, whereby during movement of said seat member toward said lower end position said two parts are mutually engaging under a prestressing force depending on said braking force.

2. A seat adjustment mechanism according to claim 1 wherein said braking means include a freewheeling sleeve connected to said one part which rotates together with said one part when said one part is moving in said second direction and which is freewheeling when said one part is moving in said first direction, said braking means further including a frictional braking device acting between said freewheeling sleeve and said base member.

3. A seat adjustment mechanism according to claim 2 wherein said braking means include a brake housing and at least one frictional ring being provided between the inner circumference of said brake housing and the outer circumference of said freewheeling sleeve.

4. A mechanism according to claim 1 wherein one of said two mutually engaging parts is closer to said motor means in the power transmission path defined by said transmission means between said seat member and said motor means and wherein when said seat member is adjustably moved in said first direction said braking means applies a braking force of such a magnitude that said one mutually engaging part is acted upon by said motor means with a seat adjusting force which is reduced by the braking action of said braking means.

5. A mechanism according to claim 1 wherein said transmission means include a drive shaft and wherein said braking means is arranged to engage the outer circumference of said drive shaft.

6. A mechanism according to claim 5 wherein said braking means include a brake housing and at least one frictional ring, said frictional ring being provided between the outer circumference of said drive shaft and the inner circumference of said brake housing.

7. A mechanism according to claim 5 wherein said drive shaft is engaged by a prestressed brake head member.

8. A mechanism according to claim 7 wherein said brake head member is formed with a bifurcated configuration having a pair of fork ends including mutually engaging means for enabling adjustment of the braking force upon said drive shaft.

9. A mechanism according to claim 7 wherein said brake head member is prestressed by means of at least one screw connection.

10. A mechanism according to claim 1 wherein said transmission means include a drive shaft and wherein said braking means include a brake housing defining an inner circumference and a freewheeling sleeve mounted between the outer circumference of said drive shaft and said inner circumference of said brake housing.

11. A mechanism according to claim 1 wherein said transmission means include a drive shaft and wherein said braking means include a brake head member for applying a braking force to said drive shaft and a freewheeling sleeve mounted inside said brake head member on the outer circumference of said drive shaft.

12. A mechanism according to claim 1 wherein said two mutually engaging transmission parts comprise a rack and a drive pinion, said drive pinion meshing with said rack to adjustably move said seat member.

13. A mechanism according to claim 12 wherein said transmission means further includes a drive shaft for driving said drive pinion and wherein said braking means engages said drive shaft.

14. A mechanism according to claim 13 wherein said drive pinion is rotatably connected with a worm gear which is arranged within a drive unit housing and which is driven by a worm, said braking means including a brake housing which is formed as part of said drive unit housing.

15. A mechanism according to claim 12 further comprising a pair of upper rails parallel with each other having said seat member mounted thereon, a pair of lower rails slidably engaged with said upper rails for guiding movement of said upper rails, each of said upper rails being provided with a rack, each of said racks being provided with a drive pinion for driving said racks, said drive pinions being connected with each other by a connector shaft which extends across said seat member, said braking means being provided at least in the area of one end of said connector shaft.

16. A mechanism according to claim 1 further comprising swiveling lever means having toothed sector means thereon with drive pinion means for vertically moving said seat member, said drive pinion means meshing with said toothed sector means, said drive pinion means being constructed as one of said two mutually engaging transmission parts and with said toothed sector being constructed as the other of said two mutually engaging transmission parts.

17. A mechanism according to claim 16 wherein said braking means engage a drive shaft of said drive pinion means.

18. A mechanism according to claim 16 wherein said braking means engage said swivel lever means.

19. A mechanism according to claim 18 wherein said swivel lever means comprise two swivel levers which are rigidly connected for rotation with each other by a connector shaft, with at least one of said swivel levers being constructed with a toothed sector of said toothed sector means, said braking means being arranged to engage said connector shaft.

* * * * *